United States Patent
Xu et al.

(10) Patent No.: US 10,605,666 B2
(45) Date of Patent: Mar. 31, 2020

(54) CEILING MOUNT INTRUSION DETECTOR WITH PIR MIRROR WITH ADJUSTABLE MOUNT HEIGHT

(71) Applicant: Honeywell International Inc., Morristown, NJ (US)

(72) Inventors: Haidong Xu, Shenzhen (CN); Dongliang Zhu, Shenzhen (CN)

(73) Assignee: ADEMCO INC., Golden Valley, MN (US)

(*) Notice: Subject to any disclaimer, the term of this patent is extended or adjusted under 35 U.S.C. 154(b) by 0 days.

(21) Appl. No.: 15/856,436

(22) Filed: Dec. 28, 2017

(65) Prior Publication Data

US 2019/0204157 A1    Jul. 4, 2019

(51) Int. Cl.
| | | |
|---|---|---|
| *G01J 5/02* | (2006.01) | |
| *G08B 13/193* | (2006.01) | |
| *G08B 13/19* | (2006.01) | |
| *G08B 13/191* | (2006.01) | |
| *G08B 13/189* | (2006.01) | |
| *G01J 5/04* | (2006.01) | |
| *G01J 5/08* | (2006.01) | |
| *G01J 5/34* | (2006.01) | |
| *G01V 8/10* | (2006.01) | |

(52) U.S. Cl.
CPC ............. *G01J 5/0205* (2013.01); *G01J 5/041* (2013.01); *G01J 5/0809* (2013.01); *G01J 5/34* (2013.01); *G01V 8/10* (2013.01); *G08B 13/189* (2013.01); *G08B 13/19* (2013.01); *G08B 13/191* (2013.01); *G08B 13/193* (2013.01)

(58) Field of Classification Search
CPC .......... G01J 5/084; G01J 5/089; G01J 5/0843; F21V 21/14; F21V 21/15; F21V 14/02
See application file for complete search history.

(56) References Cited

U.S. PATENT DOCUMENTS

| | | |
|---|---|---|
| 4,258,255 A | 3/1981 | Guscott |
| 4,339,748 A | 7/1982 | Guscott et al. |
| 4,642,454 A | 2/1987 | Carlson |
| 4,880,980 A | 11/1989 | Mueller et al. |
| 5,089,704 A | 2/1992 | Perkins |
| 5,414,255 A | 5/1995 | Hampson |
| 5,572,033 A | 11/1996 | Grant |
| 6,140,648 A | 10/2000 | Tsukamoto et al. |

(Continued)

FOREIGN PATENT DOCUMENTS

WO    2014-155088 A1    10/2014

OTHER PUBLICATIONS

"Manual Focus (Focus Mode M)", to Fujifilm (hereinafter "Fuji"), available at http://fujifilm-dsc.com/en/manual/x-t10/lens/m-focus_lens/index.html (2015).*

(Continued)

*Primary Examiner* — Kenneth J Malkowski
(74) *Attorney, Agent, or Firm* — Husch Blackwell LLP

(57) ABSTRACT

A ceiling mount intrusion detector is provided that includes a sensor, a mirror for directing collected energy towards the sensor, and a mechanism for adjusting the mirror to account for a plurality of different mount heights. In some embodiments, the mechanism can adjust the mirror by moving the mirror up or down without rotating the mirror.

10 Claims, 8 Drawing Sheets

(56) References Cited

U.S. PATENT DOCUMENTS

| | | | | |
|---|---|---|---|---|
| 6,158,658 | A * | 12/2000 | Barclay | B64F 1/366 235/375 |
| 7,115,871 | B1 * | 10/2006 | Tracy | G08B 13/193 250/349 |
| 7,375,313 | B2 * | 5/2008 | Lee | F21S 8/033 250/221 |
| 2006/0038679 | A1 | 2/2006 | Eskildsen et al. | |
| 2006/0138329 | A1 * | 6/2006 | Wu | G01D 11/245 250/342 |
| 2007/0140435 | A1 * | 6/2007 | Schwieker | A61B 6/4464 378/193 |
| 2012/0121244 | A1 * | 5/2012 | Stavely | F21V 5/007 396/175 |
| 2016/0240056 | A1 * | 8/2016 | Chen | G08B 13/2491 |
| 2017/0167923 | A1 * | 6/2017 | Xu | G01J 5/0809 |
| 2017/0211931 | A1 * | 7/2017 | Li | G01B 11/25 |

OTHER PUBLICATIONS

Partial European search report for corresponding EP application 18198272.9, dated Mar. 28, 2019.
Extended European search report for corresponding EP patent application 18198272.9, dated Jun. 17, 2019.

* cited by examiner

FIG. 4 (Prior Art)

| Mount Height: 4.3m | | | | | | | | | | | | | | | |
|---|---|---|---|---|---|---|---|---|---|---|---|---|---|---|---|
| P1-1 | P2-1 | P3-1 | P4-1 | P5-1 | P6-1 | P7-1 | P8-1 | P9-1 | P10-1 | P11-1 | P12-1 | P13-1 | P14-1 | P15-1 | P16-1 |
| 0.68 | 0.71 | 0.76 | 0.87 | 0.90 | 0.93 | 0.90 | 0.98 | 0.92 | 0.93 | 0.98 | 0.94 | 0.85 | 0.83 | 0.75 | 0.80 |
| P1-2 | P2-2 | P3-2 | P4-2 | P5-2 | P6-2 | P7-2 | P8-2 | P9-2 | P10-2 | P11-2 | P12-2 | P13-2 | P14-2 | P15-2 | P16-2 |
| 0.75 | 0.77 | 0.72 | 0.86 | 0.90 | 0.89 | 1.06 | 1.01 | 1.01 | 0.98 | 1.00 | 1.03 | 0.83 | 0.77 | 0.69 | 0.87 |

FIG. 5 (Prior Art)

| Mount Height: 3.3m, no adjustment | | | | | | | | | | | | | | | | | |
|---|---|---|---|---|---|---|---|---|---|---|---|---|---|---|---|---|---|
| P1-1 | P2-1 | P3-1 | P4-1 | P5-1 | P6-1 | P7-1 | P8-1 | P9-1 | P10-1 | P11-1 | P12-1 | P13-1 | P14-1 | P15-1 | P16-1 | Min | 0.12 |
| 0.16 | 0.12 | 0.15 | 0.19 | 0.17 | 0.16 | 0.26 | 0.26 | 0.28 | 0.28 | 0.27 | 0.28 | 0.27 | 0.25 | 0.21 | 0.19 | | |
| P1-2 | P2-2 | P3-2 | P4-2 | P5-2 | P6-2 | P7-2 | P8-2 | P9-2 | P10-2 | P11-2 | P12-2 | P13-2 | P14-2 | P15-2 | P16-2 | Average | 0.22 |
| 0.20 | 0.17 | 0.16 | 0.21 | 0.19 | 0.17 | 0.30 | 0.28 | 0.22 | 0.25 | 0.20 | 0.25 | 0.25 | 0.23 | 0.21 | 0.25 | | |

| Mount Height: 3.7m, no adjustment | | | | | | | | | | | | | | | | | |
|---|---|---|---|---|---|---|---|---|---|---|---|---|---|---|---|---|---|
| P1-1 | P2-1 | P3-1 | P4-1 | P5-1 | P6-1 | P7-1 | P8-1 | P9-1 | P10-1 | P11-1 | P12-1 | P13-1 | P14-1 | P15-1 | P16-1 | Min | 0.37 |
| 0.37 | 0.39 | 0.37 | 0.47 | 0.49 | 0.38 | 0.54 | 0.62 | 0.69 | 0.68 | 0.72 | 0.75 | 0.63 | 0.48 | 0.41 | 0.37 | | |
| P1-2 | P2-2 | P3-2 | P4-2 | P5-2 | P6-2 | P7-2 | P8-2 | P9-2 | P10-2 | P11-2 | P12-2 | P13-2 | P14-2 | P15-2 | P16-2 | Average | 0.51 |
| 0.55 | 0.43 | 0.44 | 0.46 | 0.50 | 0.40 | 0.44 | 0.57 | 0.49 | 0.41 | 0.46 | 0.61 | 0.63 | 0.53 | 0.55 | 0.44 | | |

| Mount Height: 5.0m, no adjustment | | | | | | | | | | | | | | | | | |
|---|---|---|---|---|---|---|---|---|---|---|---|---|---|---|---|---|---|
| P1-1 | P2-1 | P3-1 | P4-1 | P5-1 | P6-1 | P7-1 | P8-1 | P9-1 | P10-1 | P11-1 | P12-1 | P13-1 | P14-1 | P15-1 | P16-1 | Min | 0.10 |
| 0.66 | 0.59 | 0.47 | 0.59 | 0.51 | 0.40 | 0.31 | 0.32 | 0.33 | 0.10 | 0.12 | 0.47 | 0.18 | 0.36 | 0.50 | 0.71 | | |
| P1-2 | P2-2 | P3-2 | P4-2 | P5-2 | P6-2 | P7-2 | P8-2 | P9-2 | P10-2 | P11-2 | P12-2 | P13-2 | P14-2 | P15-2 | P16-2 | Average | 0.43 |
| 0.46 | 0.30 | 0.36 | 0.43 | 0.50 | 0.49 | 0.46 | 0.55 | 0.78 | 0.72 | 0.55 | 0.53 | 0.28 | 0.19 | 0.18 | 0.41 | | |

| Mount Height: 5.3m, no adjustment | | | | | | | | | | | | | | | | | |
|---|---|---|---|---|---|---|---|---|---|---|---|---|---|---|---|---|---|
| P1-1 | P2-1 | P3-1 | P4-1 | P5-1 | P6-1 | P7-1 | P8-1 | P9-1 | P10-1 | P11-1 | P12-1 | P13-1 | P14-1 | P15-1 | P16-1 | Min | 0.10 |
| 0.16 | 0.36 | 0.27 | 0.17 | 0.31 | 0.24 | 0.24 | 0.44 | 0.41 | 0.17 | 0.12 | 0.54 | 0.17 | 0.55 | 0.20 | 0.14 | | |
| P1-2 | P2-2 | P3-2 | P4-2 | P5-2 | P6-2 | P7-2 | P8-2 | P9-2 | P10-2 | P11-2 | P12-2 | P13-2 | P14-2 | P15-2 | P16-2 | Average | 0.28 |
| 0.42 | 0.25 | 0.21 | 0.32 | 0.10 | 0.24 | 0.35 | 0.15 | 0.23 | 0.35 | 0.51 | 0.20 | 0.44 | 0.28 | 0.13 | 0.30 | | |

| Mount Height: 3.3m, adjust | | | | | | | | | | | | | | | | | |
|---|---|---|---|---|---|---|---|---|---|---|---|---|---|---|---|---|---|
| P1-1 | P2-1 | P3-1 | P4-1 | P5-1 | P6-1 | P7-1 | P8-1 | P9-1 | P10-1 | P11-1 | P12-1 | P13-1 | P14-1 | P15-1 | P16-1 | Min | |
| 0.48 | 0.47 | 0.51 | 0.56 | 0.58 | 0.55 | 0.56 | 0.69 | 0.74 | 0.76 | 0.75 | 0.76 | 0.71 | 0.70 | 0.69 | 0.58 | 0.46 | |
| P1-2 | P2-2 | P3-2 | P4-2 | P5-2 | P6-2 | P7-2 | P8-2 | P9-2 | P10-2 | P11-2 | P12-2 | P13-2 | P14-2 | P15-2 | P16-2 | Average | |
| 0.53 | 0.50 | 0.48 | 0.55 | 0.58 | 0.46 | 0.60 | 0.66 | 0.63 | 0.61 | 0.66 | 0.73 | 0.68 | 0.70 | 0.68 | 0.74 | 0.62 | |

| Mount Height: 3.7m, adjust | | | | | | | | | | | | | | | | | |
|---|---|---|---|---|---|---|---|---|---|---|---|---|---|---|---|---|---|
| P1-1 | P2-1 | P3-1 | P4-1 | P5-1 | P6-1 | P7-1 | P8-1 | P9-1 | P10-1 | P11-1 | P12-1 | P13-1 | P14-1 | P15-1 | P16-1 | Min | |
| 0.68 | 0.63 | 0.64 | 0.75 | 0.71 | 0.73 | 0.75 | 0.96 | 0.98 | 0.92 | 0.93 | 0.92 | 0.84 | 0.81 | 0.79 | 0.88 | 0.63 | |
| P1-2 | P2-2 | P3-2 | P4-2 | P5-2 | P6-2 | P7-2 | P8-2 | P9-2 | P10-2 | P11-2 | P12-2 | P13-2 | P14-2 | P15-2 | P16-2 | Average | |
| 0.66 | 0.64 | 0.66 | 0.67 | 0.68 | 0.65 | 0.78 | 0.90 | 0.80 | 0.79 | 0.86 | 0.96 | 0.85 | 0.81 | 0.71 | 0.79 | 0.79 | |

| Mount Height: 4.3m, no need to adjust | | | | | | | | | | | | | | | | | |
|---|---|---|---|---|---|---|---|---|---|---|---|---|---|---|---|---|---|
| P1-1 | P2-1 | P3-1 | P4-1 | P5-1 | P6-1 | P7-1 | P8-1 | P9-1 | P10-1 | P11-1 | P12-1 | P13-1 | P14-1 | P15-1 | P16-1 | Min | |
| 0.68 | 0.71 | 0.76 | 0.87 | 0.90 | 0.93 | 0.90 | 0.98 | 0.92 | 0.93 | 0.98 | 0.94 | 0.85 | 0.83 | 0.75 | 0.80 | 0.68 | |
| P1-2 | P2-2 | P3-2 | P4-2 | P5-2 | P6-2 | P7-2 | P8-2 | P9-2 | P10-2 | P11-2 | P12-2 | P13-2 | P14-2 | P15-2 | P16-2 | Average | |
| 0.75 | 0.77 | 0.72 | 0.86 | 0.90 | 0.89 | 1.06 | 1.01 | 1.01 | 0.98 | 1.00 | 1.03 | 0.83 | 0.77 | 0.69 | 0.87 | 0.87 | |

| Mount Height: 5.0m, adjust | | | | | | | | | | | | | | | | | |
|---|---|---|---|---|---|---|---|---|---|---|---|---|---|---|---|---|---|
| P1-1 | P2-1 | P3-1 | P4-1 | P5-1 | P6-1 | P7-1 | P8-1 | P9-1 | P10-1 | P11-1 | P12-1 | P13-1 | P14-1 | P15-1 | P16-1 | Min | |
| 0.75 | 0.80 | 0.86 | 0.97 | 0.92 | 0.82 | 0.88 | 0.95 | 1.00 | 0.86 | 0.93 | 1.02 | 0.81 | 0.77 | 0.71 | 0.84 | 0.63 | |
| P1-2 | P2-2 | P3-2 | P4-2 | P5-2 | P6-2 | P7-2 | P8-2 | P9-2 | P10-2 | P11-2 | P12-2 | P13-2 | P14-2 | P15-2 | P16-2 | Average | |
| 0.64 | 0.73 | 0.68 | 0.94 | 0.94 | 0.84 | 0.91 | 1.01 | 1.02 | 0.97 | 0.98 | 0.90 | 0.80 | 0.69 | 0.63 | 0.87 | 0.85 | |

| Mount Height: 5.3m, adjust | | | | | | | | | | | | | | | | | |
|---|---|---|---|---|---|---|---|---|---|---|---|---|---|---|---|---|---|
| P1-1 | P2-1 | P3-1 | P4-1 | P5-1 | P6-1 | P7-1 | P8-1 | P9-1 | P10-1 | P11-1 | P12-1 | P13-1 | P14-1 | P15-1 | P16-1 | Min | |
| 0.80 | 0.79 | 0.73 | 0.95 | 0.92 | 0.84 | 0.82 | 0.95 | 0.88 | 0.80 | 0.67 | 0.68 | 0.70 | 0.77 | 0.64 | 0.81 | 0.47 | |
| P1-2 | P2-2 | P3-2 | P4-2 | P5-2 | P6-2 | P7-2 | P8-2 | P9-2 | P10-2 | P11-2 | P12-2 | P13-2 | P14-2 | P15-2 | P16-2 | Average | |
| 0.61 | 0.69 | 0.74 | 0.86 | 0.88 | 0.72 | 0.69 | 0.84 | 0.95 | 0.87 | 0.90 | 0.94 | 0.72 | 0.47 | 0.59 | 0.60 | 0.78 | |

FIG. 8

CEILING MOUNT INTRUSION DETECTOR WITH PIR MIRROR WITH ADJUSTABLE MOUNT HEIGHT

FIELD

The present invention relates generally to ceiling mount intrusion detectors. More particularly, the present invention relates to a ceiling mount intrusion detector with a passive infrared (PIR) mirror with an adjustable mount height.

BACKGROUND

Known ceiling mount intrusion detectors use a PIR sensor. However, one of the biggest challenges with known ceiling mount intrusion detectors is uncertainty in a mount height, which depends on a height of a ceiling in a region in which a ceiling mount intrusion detector is installed.

Many ceiling mount intrusion detectors claim to operate within a mount height range so as to be used in a plurality of different environments. Nevertheless, if the detector is not properly adjusted upon installation, then good performance at all mount heights within a claimed mount height range cannot be guaranteed. Furthermore, it is known that one mount height within the claimed mount range produces the best performance of the detector and that performance declines as the mount height moves away from the one mount height.

For example, some known ceiling mount intrusion detectors claim to operate within the mount height range of 2.4 m-3.3 m or 3.65 m-4.8 m. For the detector with the mount height range of 2.4 m-3.3 m, it is known that the mount height within the mount height range that produces the best performance of the detector is 2.7 m and that performance declines as the mount height moves away from 2.7 m and towards either 2.4 m or 3.3 m. Similarly, for detectors with the mount height range of 3.65 m-4.8 m, it is known that the mount height within the mount height range that produces the best performance of the detector is 4.2 m and that the performance declines as the mount height moves away from 4.2 m and towards either 3.65 m or 4.8 m. In a worst case scenario, the performance will decline to a point where the detector will not identify an alarm condition. Furthermore, neither of the above-identified detectors covers the mount height range of 3.3 m-3.65 m so the performance of the detector mounted within such a range cannot be guaranteed.

In order to guarantee the performance within the mount height range, known ceiling mount intrusion detectors include a mechanism to adjust the mount height of the detector by adjusting a PIR optical system of the detector. However, all known ceiling mount intrusion detectors that include the mechanism to adjust the mount height of the detector include a Fresnel lens and not a mirror. Nevertheless, mirrors provide several advantages as compared to Fresnel lenses. Therefore, it would be desirable for a ceiling mount intrusion detector to include the mirror as well as the mechanism to adjust the mount height.

BRIEF DESCRIPTION OF THE DRAWINGS

FIG. 4 is a table of peak-to-valley ratios of energy detected by a detector known in the art;

FIG. 5 is a table of peak-to-valley ratios of energy detected by a detector known in the art;

FIG. 8 is a table of peak-to-valley ratios of energy detected by a detector in accordance with disclosed embodiments;

DETAILED DESCRIPTION

Figure 1A:
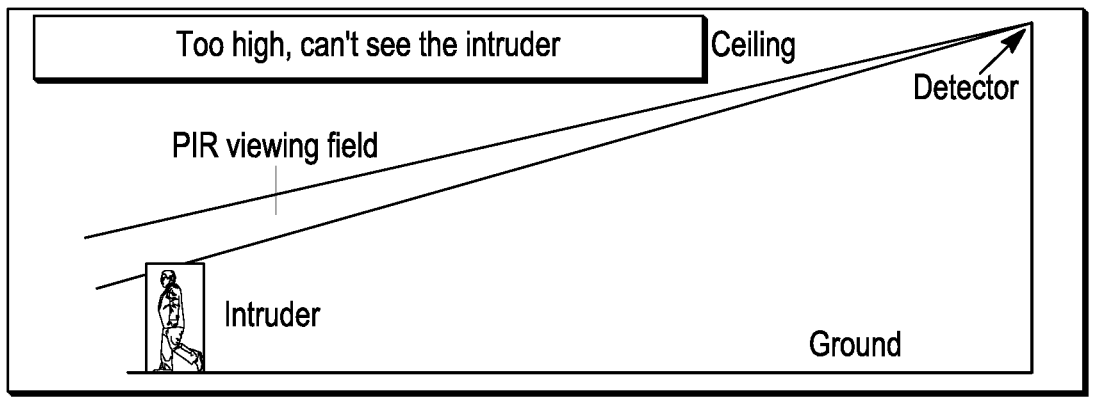
FIG. 1A is a view of a detector and a PIR viewing field known in the art.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include a ceiling mount intrusion detector with a passive infrared (PIR) mirror with an adjustable mount height. Advantageously, the ceiling mount intrusion detector disclosed herein can include a mechanism to adjust the mirror so as to compensate for the mount height of the detector to extend an operating mount height range of the detector, so as to adjust a pattern size within the operating mount height range, and so as to maintain good performance within the operating mount height range.

Figure 1B:
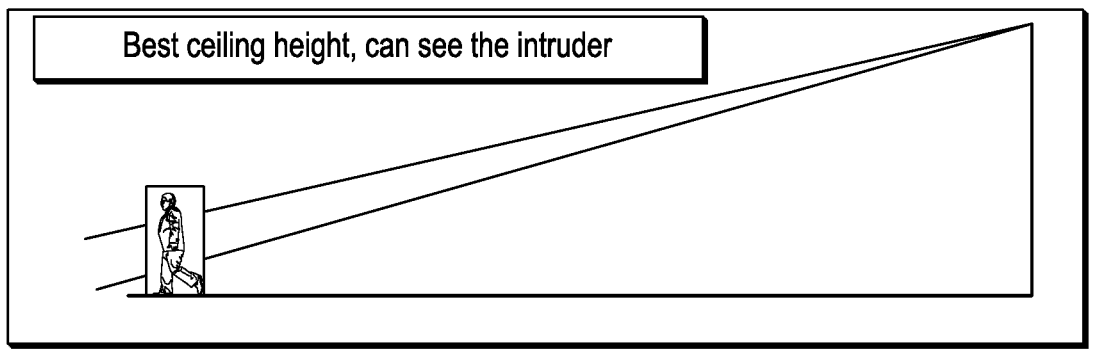
FIG. 1B is a view of a detector and a PIR viewing field known in the art.
Figure 1C:
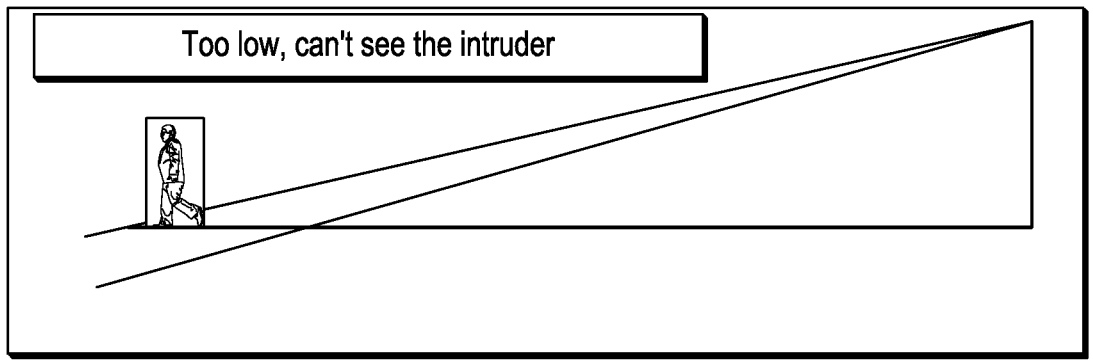
FIG. 1C is a view of a detector and a PIR viewing field known in the art.

As explained above, a ceiling height of a region in which the detector is installed can influence a performance of the detector. However, as seen with the detector shown in FIGS. 1A-1C with a fixed design as known in art, if the ceiling height is fixed, then each piece of a mirror in the detector can only collect energy transmitted from a fixed direction. Furthermore, when the ceiling height rises or falls, the mirror can no longer collect the energy emitted from an intruder or direct collected energy to a sensor in the detector.

Figure 2:
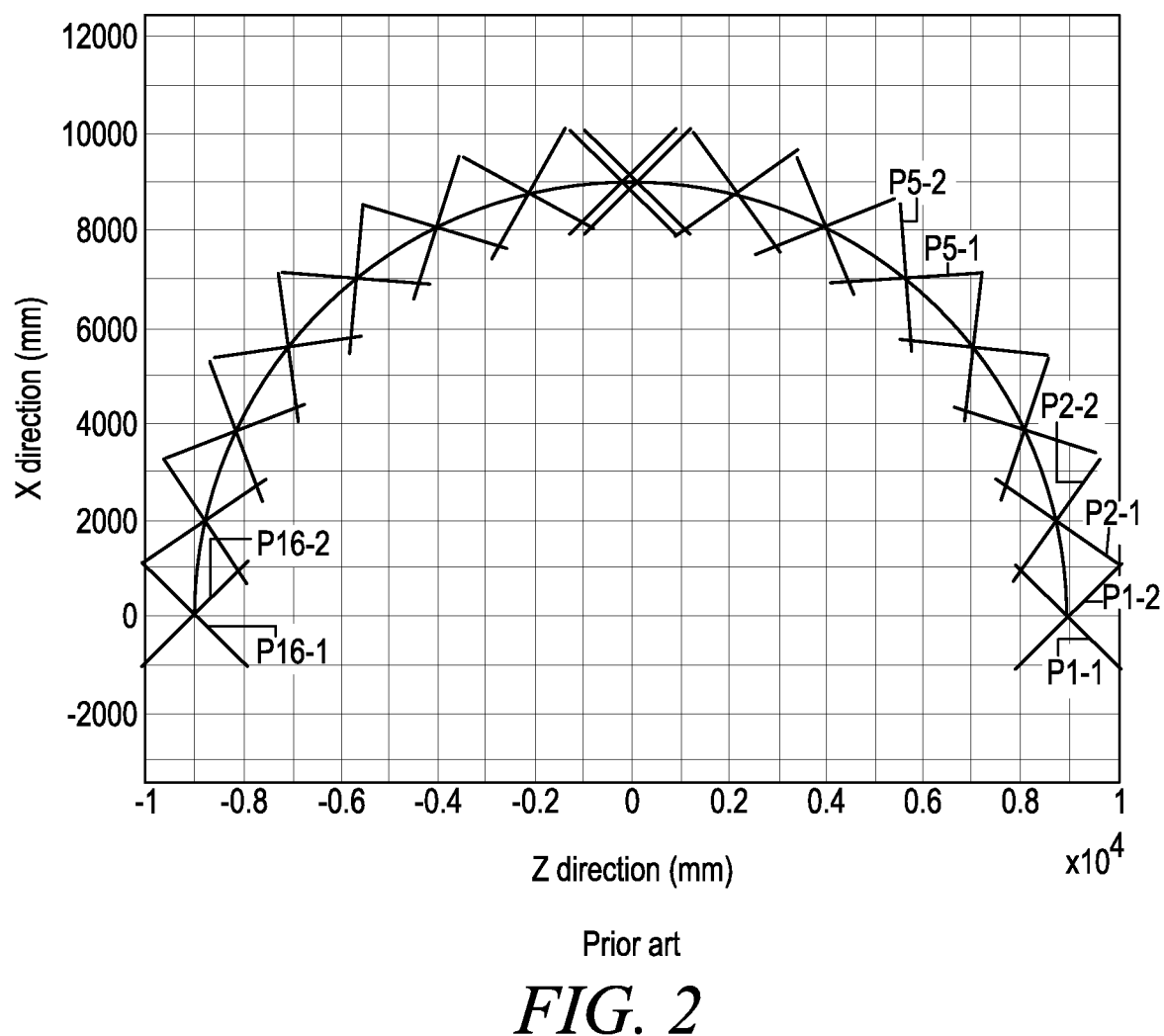
FIG. 2 is a graph of detected performance of a detector known in the art.

For example, if a ceiling mount intrusion detector that includes the PIR mirror, the mount height range of 3.3 m-5.3 m, and a detection range of 18 m, but no height adjustment mechanism, is mounted at a ceiling height of 4.3 m, then a detected performance of the detector can be shown by a pattern as illustrated in the exemplary graph of FIG. 2. It is to be understood that, because the pattern is symmetric, FIG. 2 only illustrates half of the pattern and the boundary points thereon. For example, the pattern of FIG. 2 includes lines P1-1, P1-2 ... P16-1, P16-2 such that each pair of lines, for example, P1-1 and P1-2, has a common boundary point, for example, P1.

Figure 3:
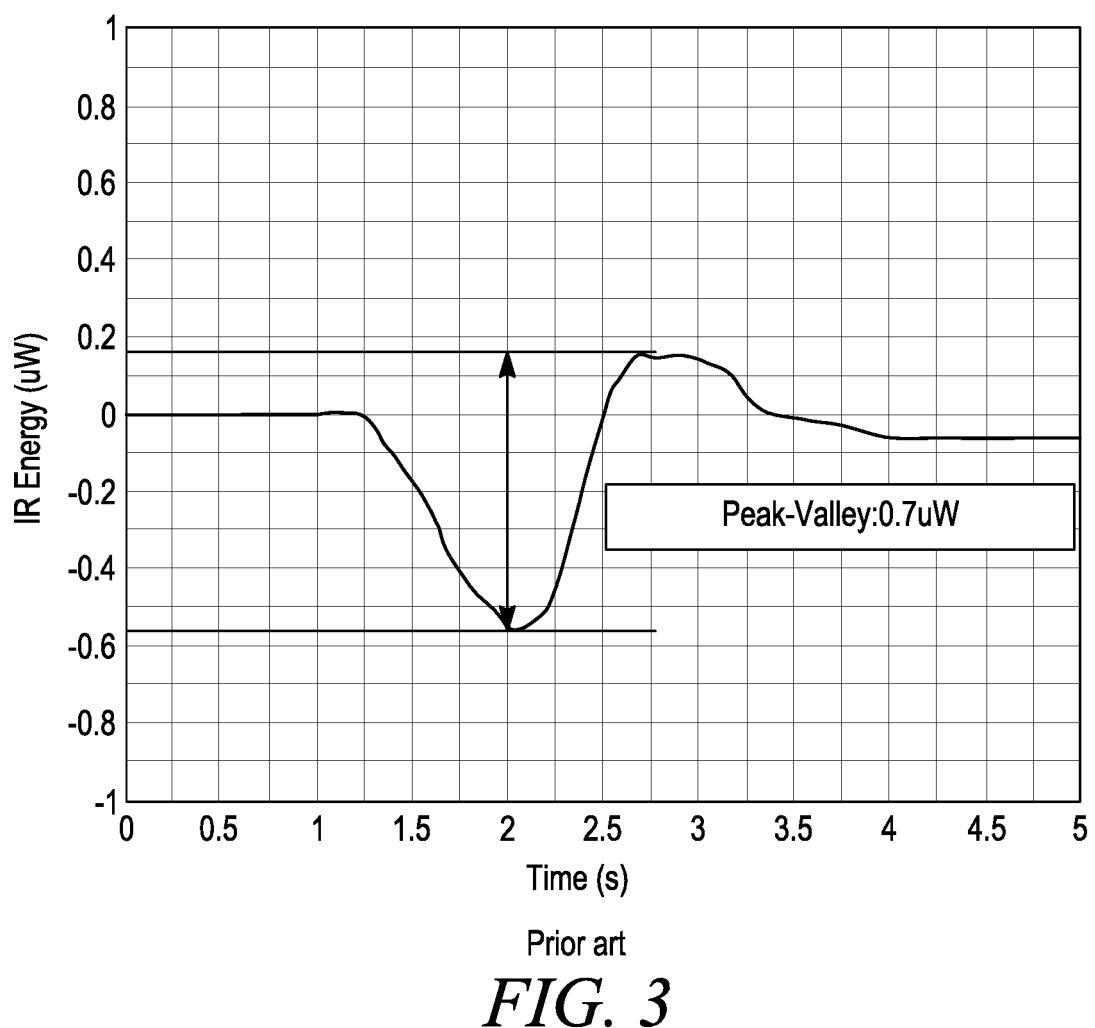
FIG. 3 is a graph of energy emitted from an intruder and directed towards a sensor of a detector known in the art.

As an intruder walks along each line represented by the lines in the pattern illustrated in the graph of FIG. 2, energy emitted from the intruder and directed towards the sensor in the detector can vary, for example, as shown in the exemplary graph of FIG. 3. The pattern illustrated in the graph of FIG. 2 includes 16 boundary points (P1-P16) and, because the intruder can cross each of the 16 boundary points in two directions, includes 32 lines (P1-1, P1-2 ... P16-1, P16-2). Accordingly, the energy emitted from the intruder and directed towards the sensor in the detector as the intruder executes a walk test by walking along each of the 32 lines and crossing each of the 16 boundary points illustrated in FIG. 2 can be illustrated with a respective graph that is similar to the exemplary graph of FIG. 3. In this regard, FIG. 4 is a table of exemplary peak-to-valley ratios of the energy detected during the walk text.

As seen in FIG. 4, a minimum peak-to-valley ratio can be 0.68 µW, a maximum peak-to-valley ratio can be 1.06 µW, and an average peak-to-valley ratio can be 0.87 µW. In these embodiments, when the peak-to-valley ratio is 0.3 µW or lower, the detector can only distinguish an alarm signal from noise, and the performance of the detector can be bad. However, when the peak-to-valley ratio is 0.5 µW or higher, the detector can identify a clear alarm signal, and the performance of the detector can be good, and when the peak-to-valley ratio is greater than 0.3 µW and less than 0.5 µW, then the performance of the detector can be average. Accordingly, when the detector is mounted at the ceiling height of 4.3 m, and the average peak-to-valley ratio is 0.87 µW, the performance of the detector can be good.

In some embodiments, the ceiling mount intrusion detector in known in the art can include the mount height range of 3.3 m-5.3 m, and FIG. 5 is a table of exemplary peak-to-valley ratios of the energy detected during the walk test when the detector known in the art is mounted at the ceiling height of 3.3 m, 3.7 m, 5.0 m, and 5.3 m. As seen in FIG. 5, when the detector is mounted at the ceiling height of 3.3 m, the average peak-to-valley ratio can be 0.22 µW so the performance of the detector can be bad. However, when the detector is mounted at the ceiling height of 3.7 m, the average peak-to-valley ratio can be 0.51 µW so the performance of the detector can be good. Furthermore, when the detector is mounted at the ceiling height of 5.0 m, the average peak-to-valley ratio can be 0.43 µW so the performance of the detector can be average, and when the detector is mounted at the ceiling height of 5.3 m, the average peak-to-valley ratio can be 0.28 µW so the performance of the detector can be bad. Accordingly, the ceiling mount intrusion detector that includes the PIR mirror and the detection range of 18 m can only operate within the mount height range of 3.6 m-4.8 m to achieve an acceptable performance.

Figure 6:
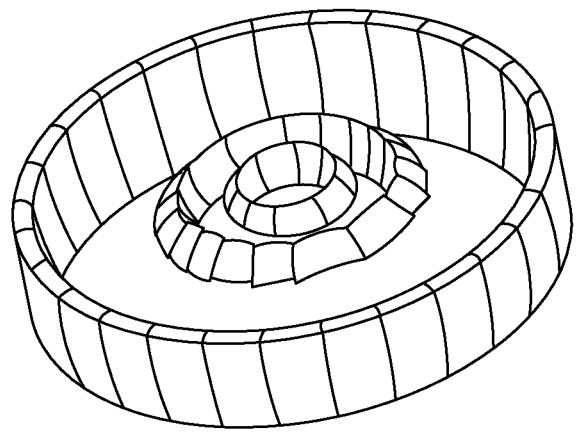
FIG. 6 is a perspective view of a PIR mirror in accordance with disclosed embodiments.

To overcome such limitations, embodiments disclosed herein can include the mechanism to adjust the mirror of the ceiling mount intrusion detector so that, when the ceiling height changes, the mirror can be changed so that the mirror can collect energy emitted from the intruder and direct the collected energy to the sensor in the detector. There are two ways to adjust a mirror's reflection angle: rotate the mirror or move the mirror. FIG. 6 is a perspective view of the PIR mirror in accordance with disclosed embodiments, and, as seen, is integrally formed by a plurality of mirrors. It is impossible to rotate each of the plurality of mirrors so the PIR mirror must be moved to adjust the reflection angle.

Figure 7A:
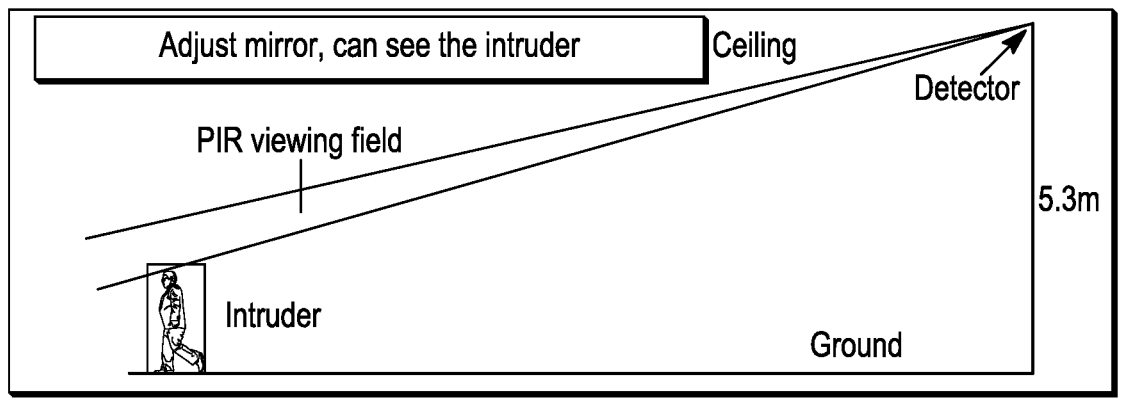
FIG. 7A is a view of a detector and a PIR viewing field in accordance with disclosed embodiments.
Figure 7B:
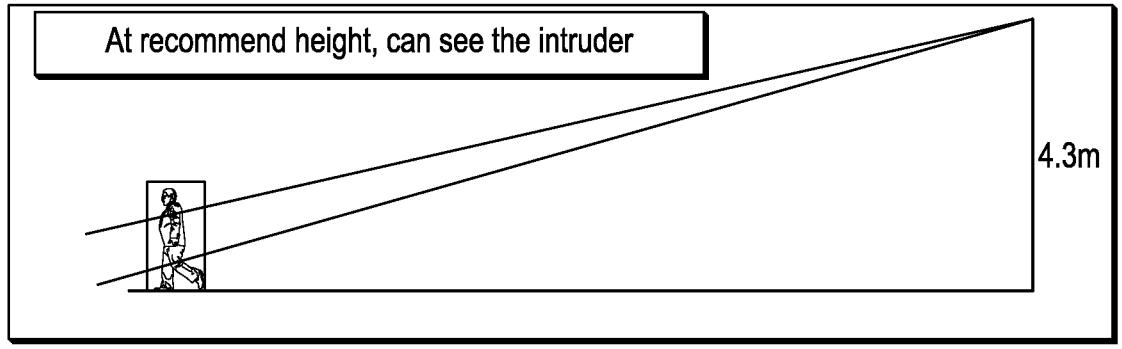
FIG. 7B is a view of a detector and a PIR viewing field in accordance with disclosed embodiments.
Figure 7C:
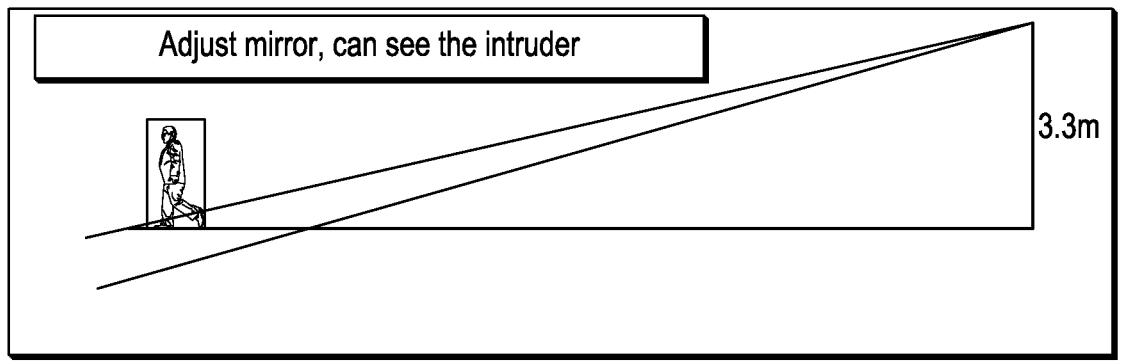
FIG. 7C is a view of a detector and a PIR viewing field in accordance with disclosed embodiments.

For example, as seen with the detector with the mechanism to adjust the mirror shown in FIGS. 7A-7C, when the ceiling height rises or falls, the mirror can collect the energy emitted from the intruder and direct the collected energy to the sensor in the detector. In this regard, FIG. 8 is a table of exemplary peak-to-valley ratios of the energy detected during the walk test by the ceiling mount intrusion detector with the mechanism to adjust the mirror in accordance with disclosed embodiments when the detector is mounted at the ceiling height of 3.3 m, 3.7 m, 4.3 m, 5.0 m, and 5.3 m. As seen, when the detector is mounted at the ceiling height of 3.3 m, 3.7 m, 4.3 m, 5.0 m, and 5.3 m, the average peak-to-valley ratio can be 0.62 µW, 0.79 µW, 0.87 µW, 0.85 µW, and 0.78 µW, respectively, so the performance of the detector at the ceiling height of 3.3 m, 3.7 m, 4.3 m, 5.0 m, and 5.3 m can be good. Accordingly, in some embodiments disclosed herein, the mechanism to adjust the mirror of the ceiling mount intrusion detector can adapt the detector for good performance and operation at ceiling height variances of up to 2 m. Furthermore, the mirror designed for the ceiling height of 4.3 m can be used at any ceiling height in the mount height range of 3.3 m-5.3 m.

In accordance with disclosed embodiments, the ceiling mount intrusion detector can include the sensor, which can include a single dual element pyroelectric sensor, and the mirror, which can be a high performance energy collector that can be adjusted to account for up to 2 m in ceiling height variances. In some embodiments, the detection range of the detector can be 16 m-20 m, and, in some embodiments, the mirror can be adjusted on a scale as the detection range changes every 0.2 m. Furthermore, in some embodiments, the detector can include a bar that includes the scale to guide a user to adjust the mirror on the scale. Further still, in some embodiments, the mirror can facilitate the detector passing known Grade 3 detector standards.

As explained above, the mirror of the ceiling mount intrusion detector disclosed herein can be an energy collector such that the mirror can collect a PIR signal from the intruder and direct the collected signal to the sensor of the detector. In some embodiments, the detector does not include a Fresnel lens and does not need a Fresnel lens to collect the energy from the intruder.

Figure 9A:
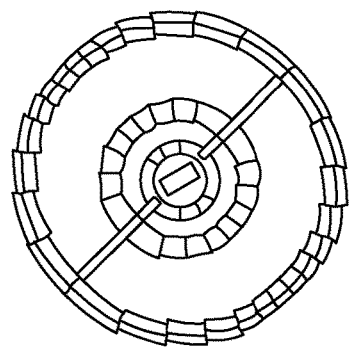
FIG. 9A is a top view of a mirror and a sensor of a ceiling mount intrusion detector in accordance with disclosed embodiments.
Figure 9B:
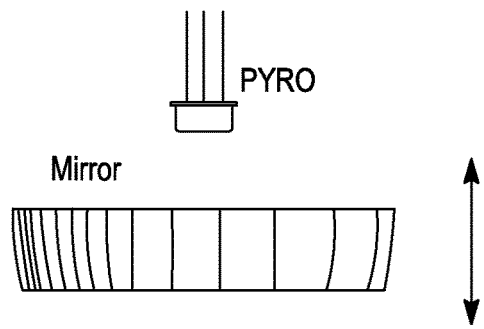
FIG. 9B is a side view of a mirror and a sensor of a ceiling mount intrusion detector in accordance with disclosed embodiments.
Figure 9C:
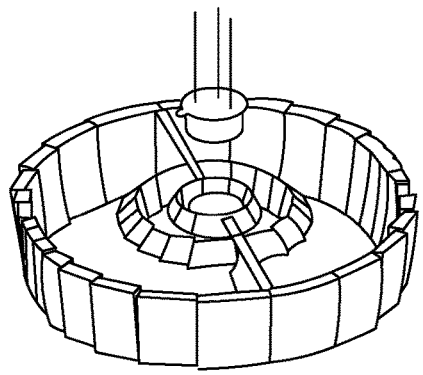
FIG. 9C is a perspective view of a mirror and a sensor of a ceiling mount intrusion detector in accordance with disclosed embodiments.

FIGS. 9A, 9B, and 9C are top, side, and perspective views, respectively, of the mirror and the sensor of the ceiling mount intrusion detector in accordance with disclosed embodiments. As seen in FIGS. 9A-9C, the mirror can include three tiers. Additionally or alternatively, in some embodiments, the mirror can include four tiers. In any embodiment, each of the tiers can approximate a respective ring, and each of the tiers can include a respective plurality of parabolic mirror pieces.

The mirror can be designed for good performance at the ceiling mount height of, for example, 4.3 m. As explained above, it is desirable to adjust the mirror to adapt the detector for good performance and operation at ceiling height variances of up to 2 m, that is, ±1 m. Accordingly, the mount height range can be 3.3 m-5.3 m. In this regard, when the mount height changes from 4.3 m to 3.3 m, systems and methods disclosed herein can adjust the mirror to move the mirror towards the sensor. Accordingly, when the detector is mounted on the ceiling and the sensor is mounted above the mirror, the mirror can be moved vertically upwards. Similarly, when the mount height changes from 4.3 m to 5.3 m, systems and methods disclosed herein can adjust the mirror to move the mirror away from the sensor. Accordingly, when the detector is mounted on the ceiling and the sensor is mounted above the mirror, the mirror can be moved vertically down.

Figure 10A:
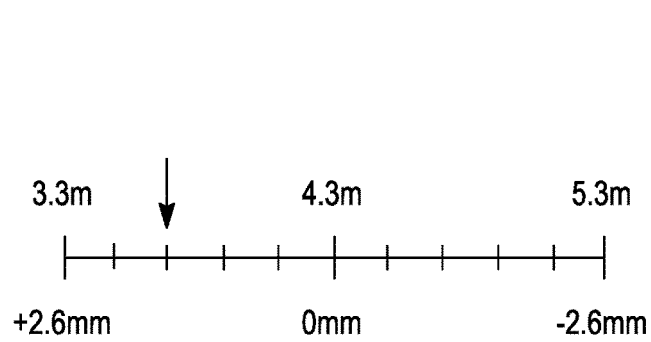
FIG. 10A is a view of a straight bar that includes a scale in accordance with disclosed embodiments.
Figure 10B:
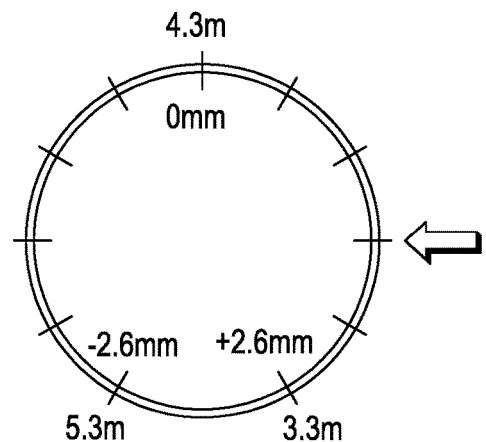
FIG. 10B is a view of a round bar that includes a scale in accordance with disclosed embodiments.

As explained above, the detector can include the bar that includes the scale to guide the user to adjust the mirror on the scale. For example, FIG. 10A is a view of a straight bar in accordance with disclosed embodiments, and FIG. 10B is a view of a round bar in accordance with disclosed embodiments. In some embodiments, the bar can be mounted in or on or be integral with a housing of the detector.

As seen, the mirror can be adjusted on the scale as the detection range changes every 0.2 m. Accordingly, when the mount height range is 3.3 m-5.3 m, the mirror can be adjusted to 11 different positions. In use, the user can adjust an arrow to the mount height for the detector to identify a distance and a direction of movement for the mirror to achieve the best performance for the detector. For example, the mount height of 4.3 m can correspond to 0 on the scale on the bar, and when the mount height changes from 4.3 m to 3.3 m, the mirror can move upwards 2.6 mm to achieve the best performance for the detector. Similarly, when the mount height changes from 4.3 m to 5.3 m, the mirror can move down 2.6 m to achieve the best performance for the detector.

In some embodiments, the user can manually or via a manual input (i.e., a knob or dial) adjust the mirror the distance and the direction identified on the scale. Additionally or alternatively, in some embodiments, the detector can automatically detect the distance and the direction identified on the scale responsive to the user setting the mount height on the scale and automatically adjust the mirror the distance and the direction accordingly, for example, using a processor executing control logic or the like. In any embodiment, the mechanism to adjust the mirror can be similar to the mechanism to adjust a zoom lens in that a mechanical ring can rotate to drive the mirror up or down without rotating the mirror. Indeed, the performance of the mirror can be non-rotationally symmetric.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A ceiling mount intrusion detector comprising:
a sensor wherein the sensor includes a single dual element pyroelectric sensor;
a mirror assembly integrally formed by a plurality of mirrors for directing collected energy towards the sensor without a Fresnel lens wherein the plurality of mirrors include a plurality of parabolic mirror pieces that form a mirrored ring; and
a processor that, responsive to receiving user input setting a mount height, automatically causes a mechanical ring to rotate to drive the mirror assembly up or down relative to the sensor to adjust a reflection angle of the mirror assembly without rotating the mirror assembly.

2. The ceiling mount intrusion detector of claim 1 wherein the sensor includes a PIR sensor.

3. The ceiling mount intrusion detector of claim 1 wherein the plurality of mirrors include a plurality of tiers.

4. The ceiling mount intrusion detector of claim 1 wherein the processor automatically moves the mirror assembly towards the sensor to account for a decrease in the mount height.

5. The ceiling mount intrusion detector of claim 1 wherein the processor automatically moves the mirror assembly away from the sensor to account for an increase in the mount height.

6. The ceiling mount intrusion detector of claim 1 further comprising a bar that includes a scale of a plurality of different mount heights.

7. A method comprising:
providing a sensor in a ceiling mount intrusion detector wherein the sensor includes a single dual element pyroelectric sensor;
providing a mirror assembly integrally formed by a plurality of mirrors in the ceiling mount intrusion detector for directing energy collected by the ceiling mount intrusion detector towards the sensor without a Fresnel lens wherein the plurality of mirrors include a plurality of parabolic mirror pieces that form a mirrored ring or a plurality of tiers;
receiving user input setting a mount height of the ceiling mount intrusion detector; and
responsive to receiving the user input, a processor automatically causing a mechanical ring to rotate to drive the mirror assembly up or down relative to the sensor to adjust a reflection angle of the mirror assembly without rotating the mirror assembly.

8. The method of claim 7 further comprising
the processor automatically moving the mirror assembly towards the sensor to account for a decrease in the mount height.

9. The method of claim 7 further comprising
the processor automatically moving the mirror assembly away from the sensor to account for an increase in the mount height.

10. The method of claim 7 further comprising:
providing a bar that includes a scale of a plurality of different mount heights.

* * * * *